United States Patent
Yoo et al.

(10) Patent No.: US 12,283,709 B2
(45) Date of Patent: Apr. 22, 2025

(54) VENTING DEVICE FOR SECONDARY BATTERIES AND POUCH-SHAPED SECONDARY BATTERY INCLUDING THE SAME

(71) Applicant: LG Energy Solution, Ltd., Seoul (KR)

(72) Inventors: In Sun Yoo, Daejeon (KR); Do Hyeon Kim, Daejeon (KR); Young Soo Oh, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 132 days.

(21) Appl. No.: 17/583,491

(22) Filed: Jan. 25, 2022

(65) Prior Publication Data

US 2022/0238954 A1    Jul. 28, 2022

(30) Foreign Application Priority Data

Jan. 25, 2021    (KR) .................. 10-2021-0010426

(51) Int. Cl.
   *H01M 50/333*    (2021.01)
(52) U.S. Cl.
   CPC ................. *H01M 50/333* (2021.01)
(58) Field of Classification Search
   CPC ............................................... H01M 2200/20
   See application file for complete search history.

(56) References Cited

U.S. PATENT DOCUMENTS

| | | | |
|---|---|---|---|
| 2016/0036024 A1 | 2/2016 | Choi et al. | |
| 2020/0321577 A1* | 10/2020 | Kim | H01M 50/595 |
| 2022/0140432 A1* | 5/2022 | Chen | H01M 50/3425 |
| | | | 429/53 |

FOREIGN PATENT DOCUMENTS

| | | | | |
|---|---|---|---|---|
| CN | 212028659 U | * | 11/2020 | .......... H01M 50/183 |
| CN | 112133865 A | * | 12/2020 | |
| CN | 214662321 U | * | 11/2021 | ............ F16K 24/04 |
| JP | 2000216068 A | * | 8/2000 | |
| JP | 2003286923 A | | 10/2003 | |
| JP | 2009297696 A | | 12/2009 | |
| JP | 2020050439 A | | 4/2020 | |
| KR | 20090095334 A | * | 9/2009 | |
| KR | 20160014828 A | | 2/2016 | |
| KR | 20200001052 A | | 1/2020 | |

(Continued)

OTHER PUBLICATIONS

English translation of Chen et al. (CN-112133865A) (Year: 2020).*

(Continued)

*Primary Examiner* — Jonathan G Leong
*Assistant Examiner* — Drew C Newman
(74) *Attorney, Agent, or Firm* — Lerner David LLP

(57) ABSTRACT

A venting device for a secondary battery, such as a pouch-shaped secondary battery includes a lower vent portion positionable within a receiving portion of a battery case, an upper vent portion positionable outside of the battery case and communicating with a cavity of the lower vent portion, and a wing portion positionable along a sealed portion of the battery case and encircling an outer perimeter of the upper vent portion. The venting device includes a discharge portion communicating with the upper vent portion, in order to allow gas to pass from the upper vent portion through the discharge portion, and a shaft unit located in the cavity of the lower vent portion, wherein the shaft unit includes an elastic portion.

16 Claims, 9 Drawing Sheets

(56) References Cited

FOREIGN PATENT DOCUMENTS

WO     WO-2019208911 A1 * 10/2019 .......... H01M 2/0207
WO     WO-2021169494 A1 * 9/2021 .......... H01M 10/613

OTHER PUBLICATIONS

English translation of Kanbe et al. (JP-2000216068-A). (Year: 2000).*
English translation of Kim et al. (KR-20090095334-A). (Year: 2009).*
English translation of Liu et al. (CN-212028659-U). (Year: 2020).*
English translation of Xu et al. (CN-214662321-U). (Year: 2021).*

\* cited by examiner

【FIG. 1A】
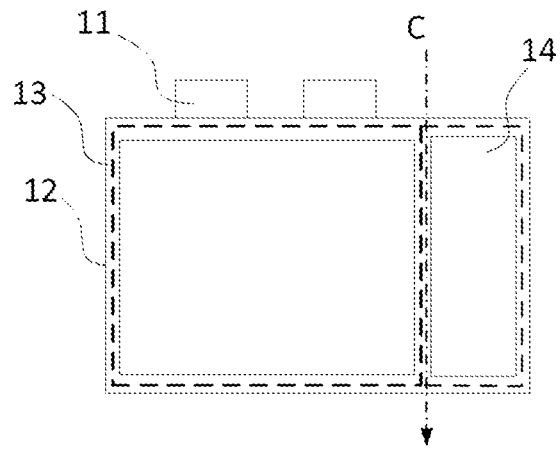
PRIOR ART
【FIG. 1B】
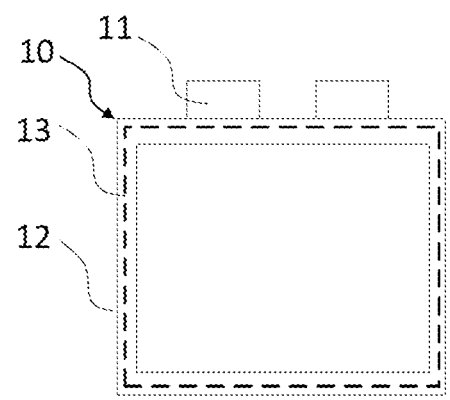
PRIOR ART
【FIG. 2】
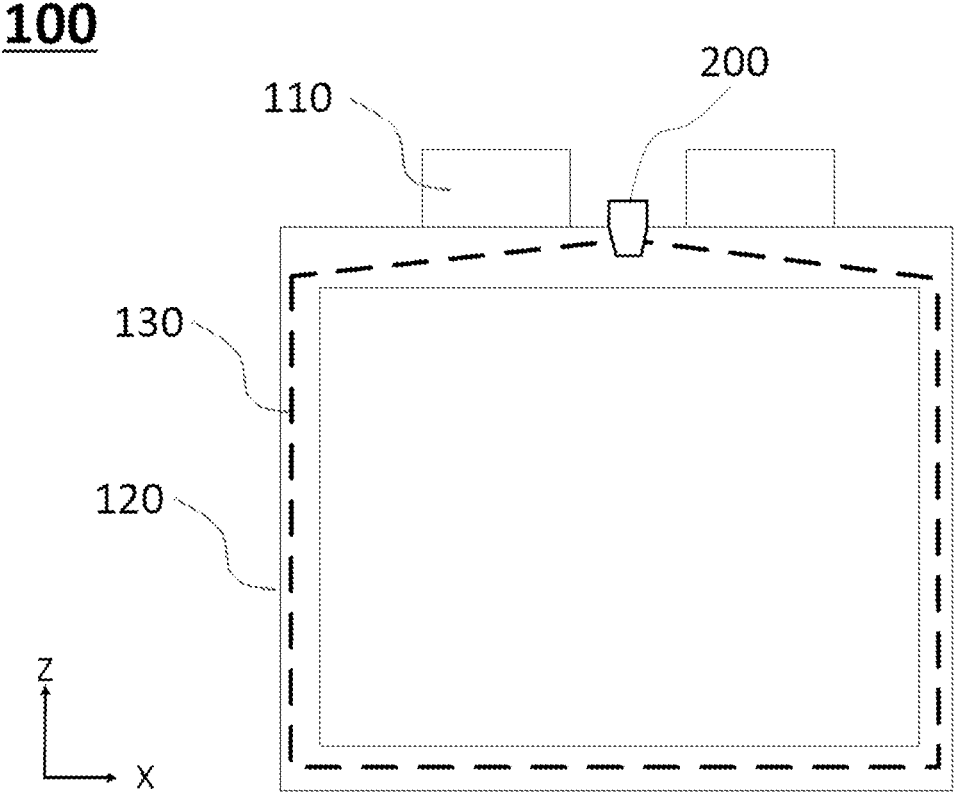

[FIG. 3]
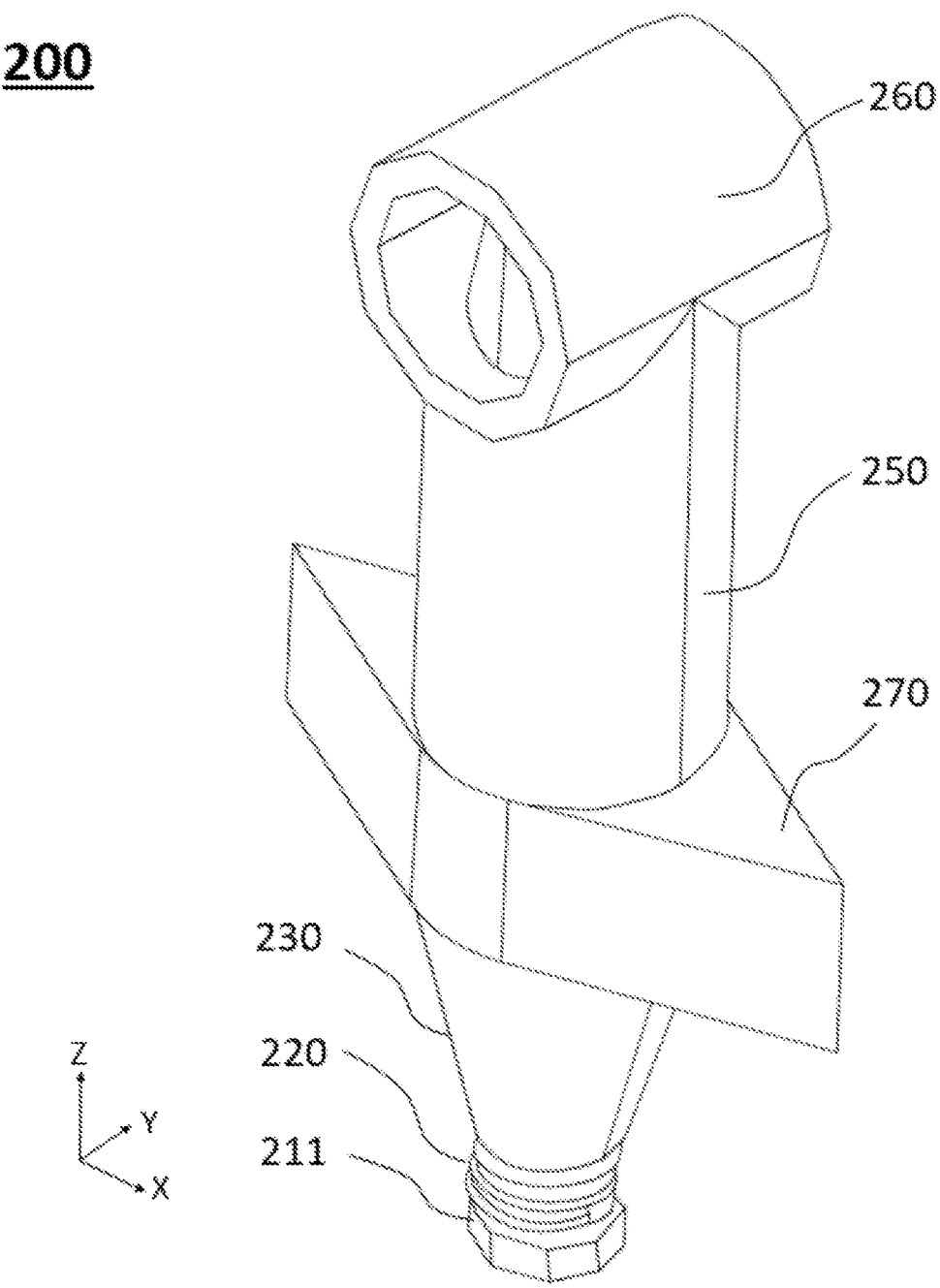

[FIG. 4]
200
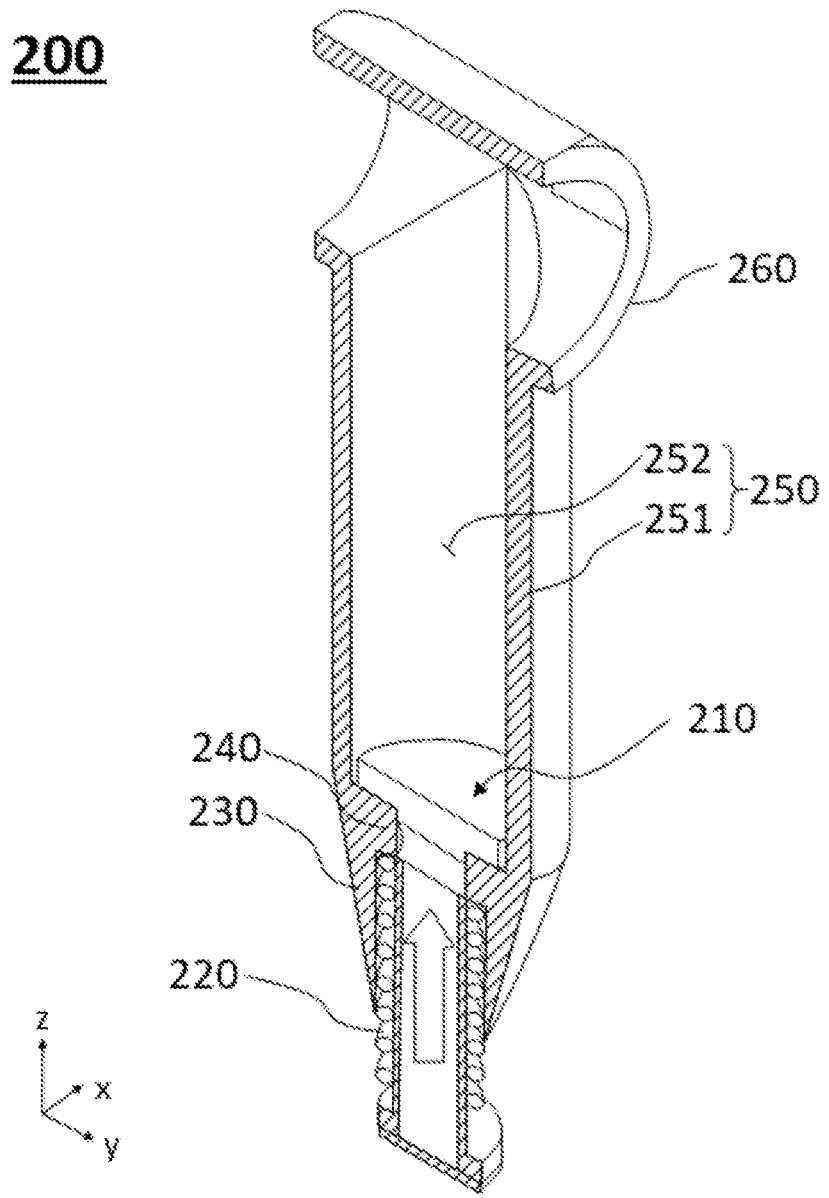

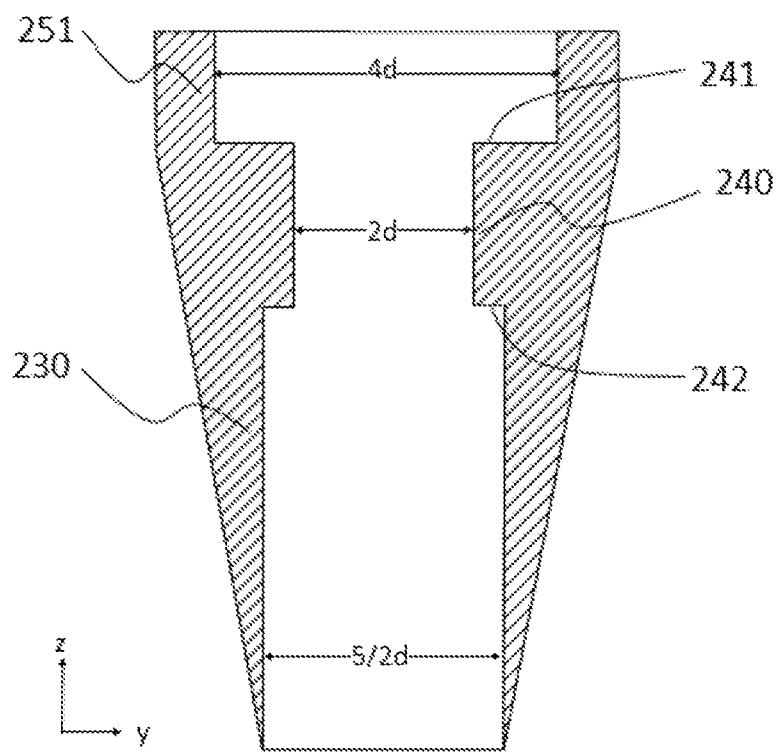
[FIG. 5]

[FIG. 6]
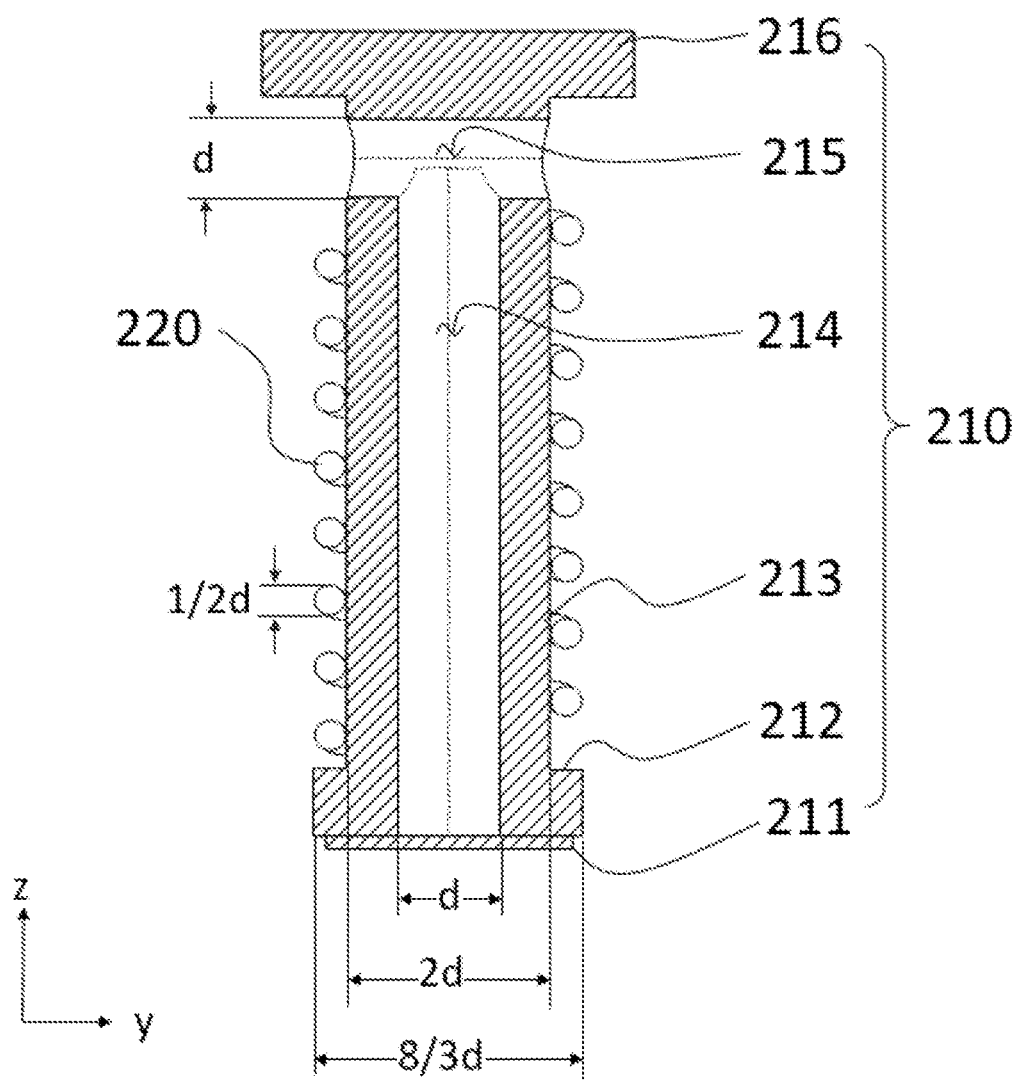

[FIG. 7]
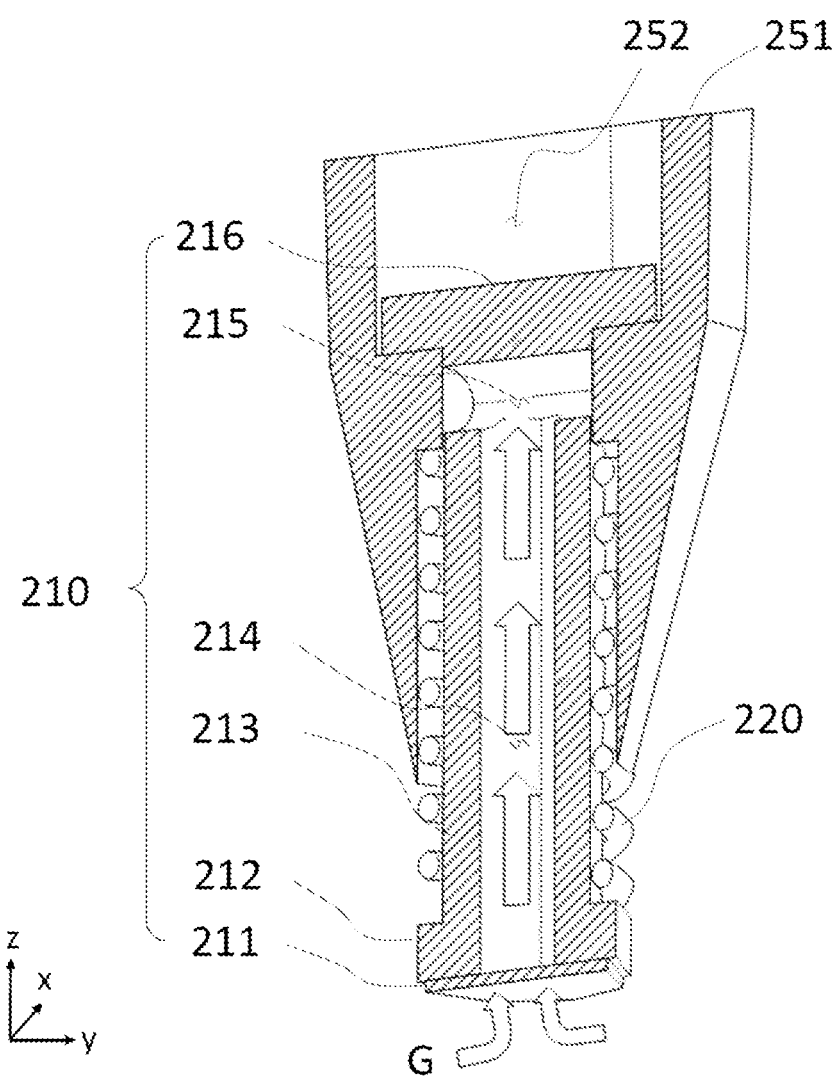

[FIG. 8]
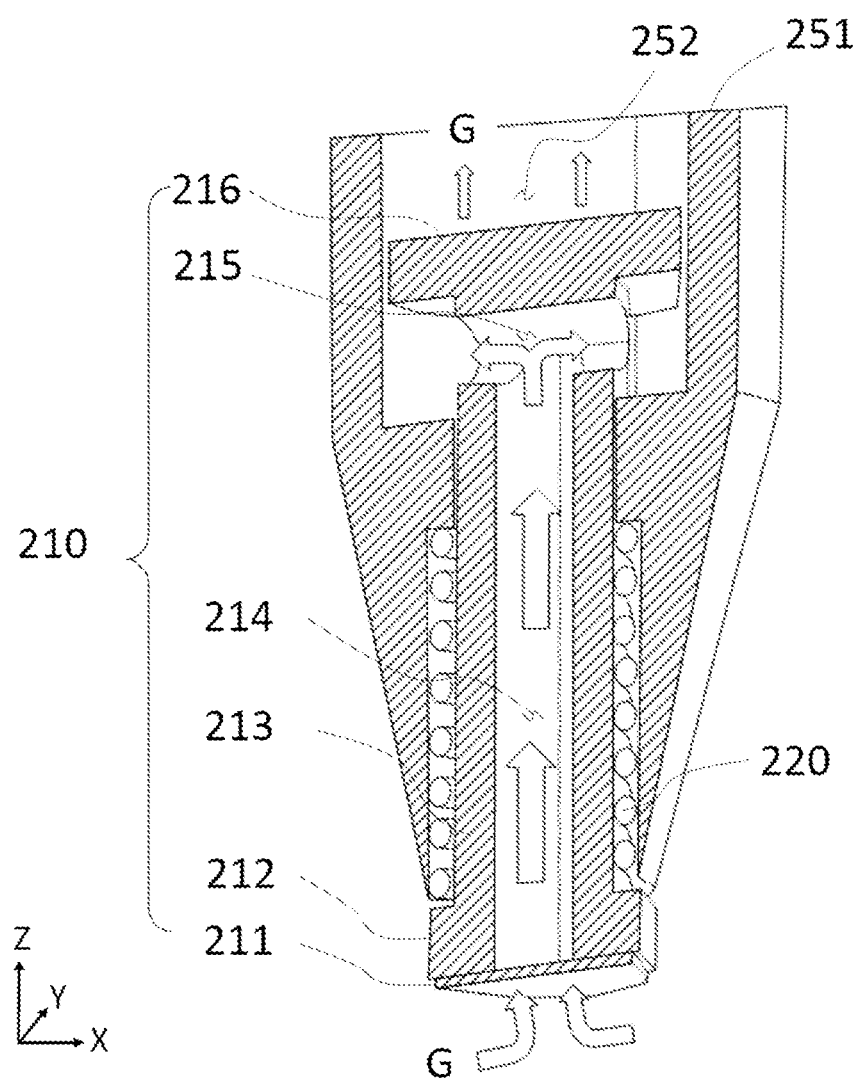

[FIG. 9]
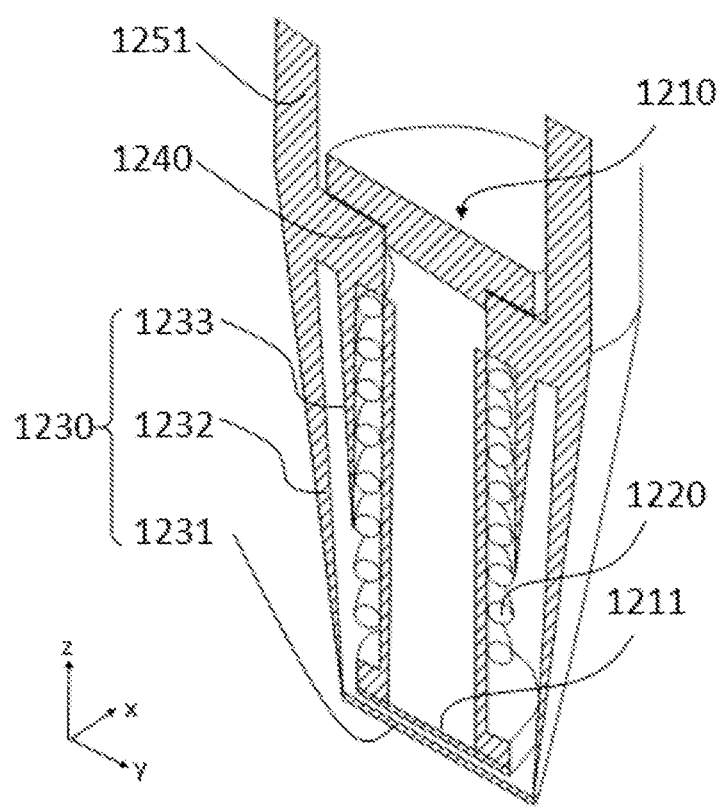

[FIG. 10]
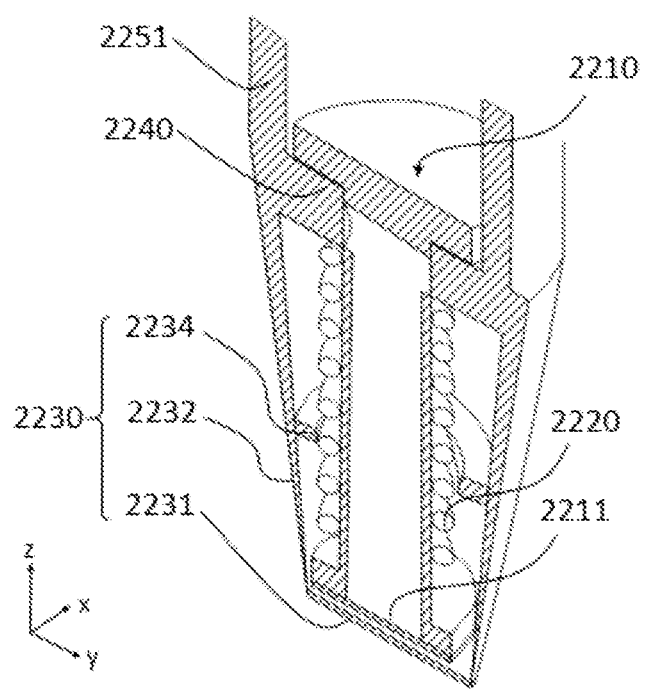

VENTING DEVICE FOR SECONDARY BATTERIES AND POUCH-SHAPED SECONDARY BATTERY INCLUDING THE SAME

CROSS-REFERENCE TO RELATED APPLICATION

The present application claims priority from Korean Patent Application No. 10-2021-0010426 filed Jan. 25, 2021, the disclosure of which is incorporated herein by reference.

TECHNICAL FIELD

The present invention relates to a venting device for secondary batteries and a pouch-shaped secondary battery including the same, and more particularly to a venting device for secondary batteries configured such that at least one venting device is inserted into a sealed portion of a battery case of a pouch-shaped secondary battery, whereby, when the pressure in the battery case is increased, it is possible to rapidly discharge only gas in the battery case to the outside and at the same time to prevent deformation of the battery case, and a pouch-shaped secondary battery including the same.

BACKGROUND ART

With an increase in demand for mobile devices, such as smartphones, demand for secondary batteries used as energy sources thereof has increased. In addition, secondary batteries are used in electric vehicles (EV), hybrid electric vehicles (HEV), plug-in hybrid electric vehicles (P-HEV), energy storage systems (ESS), etc.

Meanwhile, secondary batteries may be classified as a cylindrical battery, a prismatic battery, and a pouch-shaped battery, depending on the shape thereof. Among these batteries, the pouch-shaped battery, which can be stacked with high integration, has high energy density per unit weight, and can be easily modified, has attracted considerable attention. The pouch-shaped battery is a battery including a battery case made of a laminate sheet, and has a structure in which an electrode assembly is mounted in the battery case.

As shown in FIGS. 1A and 1B, a conventional pouch-shaped secondary battery 10 is a battery including a battery case 12 made of a laminate sheet, and has a structure in which an electrode assembly is mounted in the battery case 12. The electrode assembly is received in a receiving portion of the battery case, upper and lower edges of the battery case are brought into tight contact with each other, a portion of the tight contact region is thermally fused, an electrolytic solution is injected into the battery case, and the remaining portion of the tight contact region is sealed in vacuum to form a sealed portion 13, whereby a pouch-shaped secondary battery is completed.

For a secondary battery, a process of activating a positive electrode active material and an activation process for creating a stable solid electrolyte interface (SEI) at a negative electrode must be essentially performed first during a first cycle due to characteristics thereof. A large amount of gas is generated in a battery cell as the result of such activation processes. The generated gas is collected in a separate gas pocket 14, a battery case is cut along a cutting portion C, and thermal fusion is performed again for sealing. A process of collecting in the pocket gas that is generated in the battery cell, removing the pocket by cutting, and thermally fusing a cut region of the battery case 12 again is generally referred to as a degassing process. This process has problems in that a separate gas pocket 14 is provided; the process is complicated due to gas collection, cutting, and thermal fusion of a cut region; and cost is increased. In addition, if gas generated in the battery cell during the activation processes is not efficiently removed, the gas may occupy space in the battery cell. As a result, a central region of the battery case may swell, whereby the battery may become deformed, and the performance of the battery (such as capacity and output) and the lifespan of the battery may be adversely affected.

In addition, the pouch-shaped secondary battery, the outer cover of which is soft, may swell due to a high temperature phenomenon that may be caused by an abnormal operation of the battery, such as inner short circuit, an overcharged state exceeding allowable current and voltage, exposure to a high-temperature environment, dropping, or deformation due to external impact.

In particular, a pouch-shaped lithium secondary battery may swell due to gas generated when an electrolyte in the battery is decomposed, which is referred to as electrolytic solution swelling. Decomposition of the electrolyte is accelerated at high temperature. When the battery remains exposed to high temperature, therefore, such a swelling phenomenon is accelerated. When the temperature of the battery is increased, the electrolytic solution is decomposed or gas, such as carbon dioxide or carbon monoxide, is generated as a side reaction, whereby the pressure in the battery can further increase. When the pressure in the pouch-shaped secondary battery exceeds a specific pressure, the pouch-shaped secondary battery can explode. A danger of explosion due to an increase in inner pressure is the greatest shortcoming of pouch-shaped secondary batteries.

In the development of a pouch-shaped secondary battery, therefore, it is essential that safety be essentially considered.

Korean Patent Application Publication No. 2016-0014828 ("Patent Document 1") discloses a venting system of a pouch-shaped lithium secondary battery including a wing-shaped body portion having a hollow portion configured to allow the inside and the outside of a pouch to communicate with each other. The body portion is inserted into the pouch, with opposite surfaces of the body portion being attached to the pouch, and a gas discharge adjustment portion is installed in a passage communicating with the hollow portion of the body portion. The gas discharge adjustment portion is configured to open or close the passage depending on a change in the inner pressure of the pouch. However, Patent Document 1 does not suggest technology capable of discharging gas in a battery case to the outside and at the same time preventing leakage of an electrolytic solution, as well as technology capable of maximally guiding inner gas while minimizing face-to-face area with a receiving portion of the battery case.

Japanese Patent Application Publication No. 2020-050439 ("Patent Document 2") discloses a valve mechanism communicating with the interior of a battery case, the valve mechanism being configured to discharge gas generated in the battery case, wherein the valve mechanism includes a valve seat, a ball, a spring, and a membrane. The membrane transmits only gas in the battery case, and the gas presses the ball located above the O-ring type valve seat, whereby the spring is contracted, and thus the gas in the battery case is discharged to the outside through a gap between the ball and the valve seat. However, Patent Document 2 does not disclose technology capable of forming a stable flow channel for discharging high-pressure gas generated in the battery case.

Effective technology capable of effectively discharging gas in a battery case and at the same time preventing deformation of the battery case when the pressure in the battery case is increased has not yet been suggested.

DISCLOSURE

Technical Problem

The present invention has been made in view of the above problems. The present disclosure provides, among other things, a venting device for secondary batteries configured such that a degassing process is unnecessary, as well as a pouch-shaped secondary battery including the same.

The present disclosure also provides a venting device for secondary batteries capable of rapidly discharging high-pressure gas in a battery case while preventing deformation of the battery case when pressure in the battery case is increased, as well as a pouch-shaped secondary battery including the same.

The present disclosure also provides a venting device for secondary batteries configured to be easily coupled to a sealed portion of a battery case while minimizing deformation of the sealed portion of the battery case, as well as a pouch-shaped secondary battery including the same.

The present disclosure also provides a venting device for secondary batteries capable of stably changing a gas discharge channel depending on the pressure in a battery case, as well as a pouch-shaped secondary battery including the same.

Technical Solution

The present invention may address some of the above problems. For example, a venting device for a secondary battery according to an aspect of the present invention includes a lower vent portion, an upper vent portion, a wing portion, a discharge portion, and a shaft unit. The lower vent portion desirably defines a cavity therein and is positionable within a receiving portion of a battery case. The upper vent portion is desirably positionable outside of the battery case and communicates with the cavity of the lower vent portion. The wing portion is desirably positionable along a sealed portion of the battery case and encircles an outer perimeter of the upper vent portion. The discharge portion desirably communicates with the upper vent portion to allow gas to pass from the upper vent portion through the discharge portion. The shaft unit is desirably located in the cavity of the lower vent portion, and the shaft unit preferably includes an elastic portion.

In accordance with some aspects of the present invention, the shaft unit may further include a lower disk, a shaft body, a guide passage, and an upper disk. The lower disk is preferably located at the lower end of the shaft unit. The shaft body preferably has a flange, with the shaft body extending upwardly from the flange, and the shaft body having a main passage defined therein. The guide passage preferably extends horizontally and communicates with the main passage of the shaft body. The upper disk is preferably located at an upper end of the guide passage. The elastic portion may extend around an outer perimeter of the shaft body.

In accordance with some aspects of the present invention, the lower disk may be configured to allow a gas component generated in the battery case to pass therethrough without allowing an electrolytic solution to pass therethrough.

In accordance with some aspects of the present invention, an inner fixing portion having an opening defined therethrough may be located in the cavity of the lower vent portion, and the elastic portion may be located between the flange and the inner fixing portion.

In accordance with some aspects of the present invention, the elastic portion is configured to bias the shaft unit such that: (i) when the pressure in the battery case is normal, the guide passage of the shaft unit is sealed by a surface of the inner fixing portion, and (ii) when the pressure in the battery case is higher than a reference pressure, the shaft unit moves upwards such that the guide passage may communicate with an upper passage of the upper vent portion to form an exhaust gas flow channel through the venting device.

In accordance with some aspects of the present invention, the lower disk may be located outside the cavity of the lower vent portion.

In accordance with other aspects of the present invention, the lower disk may be located in the cavity of the lower vent portion.

In accordance with some aspects of the present invention, a lower plate may be located at a lower end of the lower vent portion, and the lower plate may be configured to allow a gas component generated in the battery case to pass therethrough without allowing an electrolytic solution to pass therethrough.

In accordance with some aspects of the present invention, a partition may be located in the cavity of the lower vent portion, and the elastic portion may be configured to bias the shaft unit such that, when a pressure in the battery case is higher than a reference pressure, the shaft unit is permitted to move upwards until the comes into contact with the partition.

The present invention desirably also provides a pouch-shaped secondary battery including the venting device for a secondary battery in accordance with any of the identified aspects of the invention, as well as a battery module including such pouch-shaped secondary battery.

In accordance with some aspects of such invention, the venting device of such pouch-shaped secondary battery may be positioned through the sealed portion of the battery case, and the venting device may be positioned adjacent to an electrode lead extending outwardly from the battery case.

In addition, the present invention may provide all possible combinations of the above solving means.

Advantageous Effects

A venting device for secondary batteries in accordance with aspects of the present invention, as well as a pouch-shaped secondary battery including the same, may not require a degassing process, whereby a process of producing the pouch-shaped secondary battery may be simplified and the cost of producing the pouch-shaped secondary battery may be reduced.

A venting device for secondary batteries according to some aspects of the present invention may be capable of transmitting only gas from the battery case when the pressure in the battery case is increased, whereby it may be possible to prevent deterioration in quality of the pouch-shaped secondary battery.

A venting device for secondary batteries according to some aspects of the present invention may include a conical lower vent portion, whereby it is possible to minimize the size of the portion of the venting device located in the battery case, and therefore it is possible to minimize the impact on the electrode assembly and the electrolytic solution in the battery case.

DESCRIPTION OF DRAWINGS

FIG. 1A is a schematic view of a conventional pouch-shaped secondary battery having a gas pocket formed therein, and FIG. 1B is a schematic view of the pouch-shaped secondary battery after the gas pocket has been removed.

FIG. 2 is a schematic view of a pouch-shaped secondary battery according to a first embodiment of the present invention.

FIG. 3 is a schematic view of a venting device according to a first embodiment of the present invention.

FIG. 4 is a vertical sectional view of the venting device of FIG. 3.

FIG. 5 is a vertical sectional view of a lower vent portion according to a first embodiment of the present invention.

FIG. 6 is a vertical sectional view of a shaft unit according to a first embodiment of the present invention.

FIG. 7 is a vertical sectional view showing the construction of the lower vent portion, the shaft unit, and an elastic portion in a normal state according to a first embodiment of the present invention.

FIG. 8 is a vertical sectional view showing a change in position of the lower vent portion, the shaft unit, and the elastic portion in a pressurized state according to a first embodiment of the present invention.

FIG. 9 is a vertical sectional view showing the construction of a lower vent portion having a vertical partition, a shaft unit, and an elastic portion according to a second embodiment of the present invention.

FIG. 10 is a vertical sectional view showing the construction of a lower vent portion having a horizontal partition, a shaft unit, and an elastic portion according to a third embodiment of the present invention.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but the one part also may be indirectly connected to the other part via a further part. In addition, the fact that a certain element is included does not mean that other elements are excluded, but rather means that such elements may be further included unless mentioned otherwise.

Hereinafter, a venting device for secondary batteries according to the present invention will be described with reference to the accompanying drawings.

FIG. 2 is a schematic view of a pouch-shaped secondary battery according to a first embodiment of the present invention.

Referring to FIG. 2, in the pouch-shaped secondary battery 100 according to the first embodiment of the present invention, a battery case 120 performs functions of protecting internal components (such as an electrode assembly and an electrolytic solution), complementing electrochemical properties by the electrode assembly (not shown) and the electrolytic solution (not shown), and dissipating heat.

Here, the battery case 120 may be made of a laminate sheet including a resin layer and a metal layer, and the edge of the battery case may be thermally bonded in the state in which the electrode assembly and the electrolytic solution are received in the battery case, whereby a sealed portion 130 may be formed. More specifically, the battery case 120 may be constituted by two cases, i.e., an upper case (not shown) and a lower case (not shown), at least one of which is provided with a concave inner space. The edges of the upper case and the lower case may be thermally bonded, whereby the inner space in which the electrode assembly is received may be hermetically sealed.

In addition, the laminate sheet generally includes a gas barrier layer, a surface protection layer, and a sealant layer. The gas barrier layer provides mechanical strength to the battery case, prevents introduction of gas or moisture into the secondary battery from the outside, and prevents leakage of the electrolytic solution.

In general, the gas barrier layer includes a metal, and aluminum (Al) foil is mainly used. The reason for this is that aluminum foil exhibits more than a predetermined level of mechanical strength, is lightweight, complements electrochemical properties of the electrode assembly and the electrolytic solution, and provides heat dissipation.

The surface protection layer is made of a polymer, and is located at the outermost layer to electrically insulate the electrode assembly from the outside while protecting the secondary battery from friction and collision with the outside. Here, the outermost layer is a layer oriented outwardly in a direction opposite to an inward direction (towards the electrode assembly).

The surface protection layer is mainly made of a polymer that exhibits wear resistance and heat resistance, such as a nylon resin or polyethylene terephthalate (PET). In addition, the surface protection layer may have a single film structure constituted by any one material or a composite film structure including a layer formed by each of two or more materials.

The sealant layer is made of a polymer, and is located at the innermost layer so as to directly contact the electrode assembly. When the laminate sheet having the above-described stacked structure is drawn using a punch, a portion of the laminate sheet is stretched, whereby an upper receiving portion or a lower receiving portion is formed in the pouch-shaped battery case 120.

After the electrode assembly is received in the receiving portion, the electrolytic solution is injected into the receiving portion. Afterwards, the upper case and the lower case are brought into contact with each other, and the edges of the upper case and the lower case are pressed against each other while heat is applied thereto, whereby the sealant layers are bonded to each other, and thus the battery case 120 becomes hermetically sealed.

Since the sealant layer directly contacts the electrode assembly, the sealant layer must have an insulating property, and since the sealant layer also contacts the electrolytic solution, the sealant layer must have corrosion resistance. In addition, since the battery case must be completely hermetically sealed in order to prevent movement of a material between the inside and the outside of the battery case, the sealant must have high sealability. That is, the sealed portion formed as the result of bonding the sealant layers must have excellent thermal bonding strength.

In general, the sealant layer is mainly made of a polyolefin-based resin, such as polypropylene (PP) or polyethylene (PE). Since polypropylene (PP) exhibits excellent mechanical-physical properties, such as tensile strength, rigidity, surface hardness, wear resistance, and heat resistance, as well as excellent chemical properties, such as corrosion resistance, polypropylene is mainly used to manufacture the sealant layer. Furthermore, the sealant layer may be made of cast polypropylene or a polypropylene-butylene-ethylene terpolymer. In addition, the sealant layer may have a single film structure constituted by any one material or a composite film structure including a layer formed by each of two or more materials.

Next, the electrode assembly will be described. Although not shown, the electrode assembly may be configured to have a structure in which a positive electrode plate and a negative electrode plate are disposed so as to face each other. Each of the positive electrode plate and the negative electrode plate is formed so as to have a structure in which an active material slurry is applied to a current collector. In general, the slurry may be formed by stirring active material particles, an auxiliary conductor, a binder, and a plasticizer to which a solvent has been added.

The positive electrode plate and the negative electrode plate are formed so as to be flat, and they are spaced apart from each other so as to face each other. A separator is interposed between the positive electrode plate and the negative electrode plate in order to prevent direct contact between the positive electrode plate and the negative electrode plate. The separator isolates the positive electrode plate and the negative electrode plate from each other to prevent the occurrence of short circuit therebetween; however, the separator may be configured to have a porous structure such that movement of electric charge is possible during charging or discharging.

The electrode assembly having the above construction may be configured as a stacked type electrode assembly, a wound type electrode assembly, or a stacked and folded type electrode assembly. A stacked type electrode assembly is one in which a plurality of positive electrode plates and a plurality of negative electrode plates are alternately stacked. A wound type electrode assembly is one in which one positive electrode plate and one negative electrode plate are wound with a separator interposed therebetween.

Meanwhile, a solid electrolyte, a gel type quasi-solid electrolyte (in which an additive is added to a solid electrolyte so as to have an intermediate state between liquid and solid), or a liquid electrolyte (as is commonly used) may be used as an electrolyte.

An electrode tab may be formed at each of the positive electrode plate and the negative electrode plate so as to protrude therefrom, and an electrode lead 110, which is a portion that is electrically connected to the electrode tab and that is exposed outwards from the battery case 120, serves as an electrode terminal configured to be electrically connected to another secondary battery or an external device. Of course, the electrode tab alternatively may be directly connected to the external device with the omission of the electrode lead 110. Although the electrode leads 110 are oriented in the same direction in FIG. 2, the electrode leads may alternatively be oriented in opposite directions.

A venting device 200 according to a first embodiment of the present invention may be located adjacent to the electrode lead 110, specifically between a pair of electrode leads 110 extending from the battery case 120, so as to be oriented in the same direction as the electrode lead(s) 110. The reason for disposing the venting device 200 in the vicinity of the electrode leads 110, the temperature of which may be relatively rapidly increased and which may be easily expanded during repeated charging and discharging, is that it may facilitate the rapid discharge of gas from the battery case 120.

Here, the sealed portion 130 of the battery case 120 in which the venting device 200 is located may extend obliquely from the venting device 200. The reason for this is that it may facilitate moving gas generated in the battery case 120 toward the venting device 200.

FIG. 3 is a schematic view of a venting device according to a first embodiment of the present invention, and FIG. 4 is a vertical sectional view of the venting device of FIG. 3.

Referring to FIGS. 3 and 4, the venting device 200 according to the first embodiment of the present invention may mainly include a lower vent portion 230, an upper vent portion 250, a discharge portion 260, and a wing portion 270.

The discharge portion 260 is horizontally located at the uppermost end of the venting device 200, and the discharge portion 260 has a horizontal hollow passage formed therein. Gas discharge ports may be formed in opposite ends of the discharge portion 260, and each of the gas discharge ports may be provided with a cover configured to cover the respective gas discharge port in a normal state. The cover may be opened by gas discharged from the interior of the battery case 120, whereby the gas may be discharged to the outside.

The upper vent portion 250 may be located vertically (in a Z-axis direction) below the discharge portion 260 while communicating with a middle portion of the lower end of the discharge portion 260. The upper vent portion 250 may be formed in a cylindrical shape, and the upper vent portion 250 may have an upper passage 252 defined by an upper body 251 surrounding the upper passage 252. The upper passage 252 may communicate with the hollow passage of the discharge portion 260 to form a gas flow channel.

The lower vent portion 230 may be formed by extending the upper body 251 of the upper vent portion 250. Alternatively, the upper vent portion 250 and the lower vent portion 230 may be separately manufactured and may then be coupled to each other. Here, the lower vent portion 230, which may have a hollow structure, may have a wide top portion and a narrow bottom portion, i.e., it may be conical.

The wing portion 270 may be formed so as to have a width gradually decreasing toward opposite ends thereof while extending around the outer circumference of the upper vent portion 250. The reason for this is that it may facilitate joining the wing portion to the sealed portion 130 of the battery case 120 while minimizing deformation of the sealed portion after the wing portion is inserted into the sealed portion. The venting device 200 and the battery case 120 are coupled to each other along the outer circumferential surface of the wing portion 270.

FIG. 5 is a vertical sectional view of a lower vent portion according to a first embodiment of the present invention, FIG. 6 is a vertical sectional view of a shaft unit according to the first embodiment of the present invention, FIG. 7 is a vertical sectional view showing the construction of the lower vent portion, the shaft unit, and an elastic portion in a normal state according to the first embodiment of the present invention, and FIG. 8 is a vertical sectional view showing a change in position of the lower vent portion, the shaft unit, and the elastic portion in a pressurized state according to the first embodiment of the present invention.

The lower vent portion 230, the shaft unit 210, and the elastic portion 220 will be described in detail with reference to FIGS. 5 to 8.

An inner fixing portion 240 may be located along an inner side wall of the upper part of the lower vent portion 230, and the inner fixing portion 240 may be a plate that is horizontally located in an inner space of the lower vent portion 230 and that has a central hole formed therein. The section (xy plane) of the hollow portion of the lower vent portion 230 and the section (xy plane) of the central hole of the inner fixing portion 240 have the same center. Here, an upper end surface 241 of the inner fixing portion 240 may be located in the upper vent portion 250, where it supports an upper disk 216 of the shaft unit 210, a description of which will follow.

The shaft unit 210 may include a cylindrical shaft body 213, a lower disk 211 located at the lower end of the shaft body 213 (the lower disk being configured to cover a lower-end inlet of the shaft body 213), a main passage 214 vertically formed in the shaft body 213, a guide passage 215 configured to communicate with the main passage 214 (the guide passage being horizontally oriented), and an upper disk 216 horizontally arranged at the upper end of the guide passage 215. The guide passage 215 is formed so as to vertically communicate with the main passage 214, and the guide passage 215 guides gas introduced through the main passage 214 in opposite directions. Gas is discharged through discharge ports formed in opposite ends of the guide passage 215.

The lower disk 211 may be made of a polytetrafluoroethylene (PTFE) membrane or Gore-Tex, which does not allow the transmission of the electrolytic solution in the battery case 120 but instead transmits only gas. The lower disk 211 may alternatively be configured by attaching the PTFE membrane or the Gore-Tex to a rigid member having predetermined porosity.

The lower disk 211 may be directly coupled to the shaft body 213, or the lower disk 211 may be coupled to a lower flange 212 extending outwards at the lower end of the shaft body 213. In the case in which the lower flange 212 is located at the lower end of the shaft body 213, the PTFE membrane or the Gore-Tex may be directly attached to the lower flange 212 without first attaching the PTFE membrane or the Gore-Tex to a rigid member. Desirably, attaching the PTFE membrane or the Gore-Tex directly to the lower flange 212 without the rigid member may make it easier to discharge the high pressure gas G in the battery case 120 to the outside than when the rigid member is present.

The elastic portion 220 is located about the outer circumferential surface of the shaft body 213, specifically between an upper end surface of the lower flange 212 and a lower end surface 242 of the inner fixing portion. Here, the elastic portion 220 may be constituted by a spring, e.g., one made of stainless steel. The modulus of elasticity of the elastic portion 220 may be set based on reference pressure of gas venting from the battery case 120.

When the pressure in the battery case 120 reaches the reference pressure, the elastic portion 220 contracts, whereby the shaft unit 210 moves upwardly toward the upper vent portion 250. Thus, the guide passage 215, which was initially sealed by tight contact with the vertical section (xz plane) (i.e., the radially inwardly facing surface) of the inner fixing portion 240, moves upwardly toward the upper passage 252. As a result, the main passage 214 and the guide passage 215 of the shaft unit 210 come into communication with the upper passage 252 of the upper vent portion 250 to form a gas flow channel.

In addition, a lateral outer circumferential surface of the upper disk 216 of the shaft unit 210 and an inner circumferential side surface of the upper passage 252 of the upper body 251 are spaced apart from each other by a predetermined distance to form a channel configured to allow the gas G introduced from the battery case 120 to be discharged to the outside. That is, an integrated gas flow channel is defined by the main passage 214 and the guide passage 215 of the shaft unit 210, the upper passage 252 of the upper vent portion 250, the gap between the lateral outer circumferential surface of the upper disk 216 and the inner circumferential side surface of the upper passage 252 of the upper body 251, and the hollow passage of the discharge portion 260.

In a normal state, the lower flange 212 and the lower end of a conical body of the lower vent portion 230 are spaced apart from each other. The elastic portion 220 then contracts when the pressure in the battery case 120 is increased, and, as a result, the shaft unit 210 is moved upwardly toward the upper vent portion 250 by the reduced length of the elastic portion 220. In addition, the lower flange 212 and the lower disk 211 move toward the conical body of the lower vent portion 230, and the elastic portion is prevented from contracting any further when the lower flange 212 is brought into tight contact with the lower end of the conical body of the lower vent portion 230. At such point the entirety of a lateral section (yz plane) of the guide passage 215 of the shaft unit 210 is located in the upper passage 252, whereby the gas flow channel may reach its maximum cross-sectional area. At the same time, the length of the lower vent portion 230 along the z axis may be minimized, due to the contraction of the elastic portion 220 and the shaft unit 210 into the venting device 200. As a result, the dimension of the venting device 200 extending into the pouch-shaped secondary battery 100 may be reduced, and therefore it is possible to minimize any impact on the pouch-shaped secondary battery 100.

When the pressure is restored to a normal state after the gas is discharged from the battery case 120, the elastic portion 220 is returned to the initial state, whereby the shaft unit 210 is moved downwardly within the lower vent portion 230, and the upper disk 216 is brought into tight contact with the upper end surface 241 of the inner fixing portion 240.

The venting device 200 according to the first embodiment of the present invention may be made of a superplastic material, excluding the lower disk 211 and the elastic portion 220. The reason for this is that it may minimize an increase in weight of the secondary battery while maintaining rigidity of the venting device 200.

Also, in an example in which the inner diameters of the main passage 214 and the guide passage 215 of the shaft unit 210 according to the first embodiment of the present invention are equal to each other and have a diameter d, the outer diameter of the shaft body 213 may be 2d, the outer diameter of the lower flange 212 may be 8/3d, the inner diameter of the hollow portion of the lower vent portion 230 may be 5/2d, the diameter of the central hole of the inner fixing portion 240 may be 2d, and the inner diameter of the upper passage 252 may be 4d. The inner diameter d of the main passage 214 is not particularly restricted as long as deformation of the battery case 120 is not caused and the performance of the secondary battery 100 is not lowered. In the present invention, d may be 1.5 mm or more. If d is less than 1.5 mm, it may not be possible to smoothly discharge high-pressure gas from the battery case.

FIG. 9 is a vertical sectional view showing the construction of a lower vent portion having a vertical partition, a shaft unit, and an elastic portion according to a second embodiment of the present invention.

Referring to FIG. 9, a venting device according to a second embodiment of the present invention is identical to the venting device 200 described with reference to FIGS. 4 to 8, except that the lower vent portion 1230 according to the second embodiment of the present invention includes a vertical partition 1233 formed therein, a lower body 1232 (which is a conical body), and a lower plate 1231 provided at the lower end of lower body. Therefore, only the lower vent portion 1230 will be described hereinafter.

A lower disk 1211 of the shaft unit 1210 according to the second embodiment of the present invention is located in an inner space defined by the lower plate 1231 and the lower body 1232, and the shaft unit 1210 is located in an inner space defined by the upper body 1251, the lower body 1232, and the lower plate 1231. Consequently, contact between the elastic portion 1220 and the electrolytic solution of the secondary battery is prevented, whereby introduction of the electrolytic solution into the upper passage is fundamentally prevented during contraction and restoration of the elastic portion 1220 (and upward and downward movement of the shaft unit 1210), and therefore only high-pressure gas in the battery case may be discharged to the outside.

The lower plate 1231 according to the second embodiment of the present invention may be made of the same material as the lower disk 1211. That is, the lower plate may be made of a polytetrafluoroethylene (PTFE) membrane or Gore-Tex, which does not allow the transmission of the electrolytic solution in the battery case but instead transmits only gas. The lower disk 1211 may alternatively be configured by attaching the PTFE membrane or the Gore-Tex to a rigid member having predetermined porosity. In addition, although not shown in FIG. 9, a flange (not shown) may be provided at the lower end of the lower body 1232 so as to extend outwardly in the inner space of the lower vent portion 1230, such that a sheet made of the PTFE membrane or the Gore-Tex may be joined to the flange (not shown). As noted above, attaching the PTFE membrane or the Gore-Tex directly to the lower flange 212 without first attaching the PTFE membrane or the Gore-Tex to a rigid member may make it easier to discharge the high pressure gas G to the outside than when a rigid member is present.

In addition, the lower vent portion 1230 according to the second embodiment of the present invention may include a vertical partition 1233 vertically extending from an inner fixing portion 1240 in a direction toward the lower disk 1211. The elastic portion 1220 may be located between the vertical partition 1233 and an outer wall of a shaft body of the shaft unit 1210, and the elastic portion 1220 may be contracted until a lower flange is brought into tight contact with the lower end of the vertical partition 1233. In FIG. 9, the vertical partition 1233 is shown as having a wide top and narrow bottom shape. However, the shape of the vertical partition is not limited thereto as long as the volume of the lower vent portion 1230 is not increased. Also, in FIG. 9, the vertical partition 1233 is shown as being spaced apart from an inner wall of the lower body 1232. However, the vertical partition may be disposed in tight contact with the inner wall of the lower body 1232, or the vertical partition may be integrally formed with the inner wall of the lower body 1232. In addition, the vertical partition 1233 may be an integrated partition configured to extend around the circumference of the elastic portion 1220, or the vertical partition may be constituted by two or more partitions spaced apart from each other by a predetermined distance.

When the pressure in the battery case is increased, the elastic portion 1220 contracts, and, as a result, the shaft unit 1210 is moved upwardly toward the upper vent portion. That allows high-pressure gas to be discharged to the outside via an integrated gas flow channel defined by the main passage and the guide passage of the shaft unit 1210, a space between the upper disk of the shaft unit 1210 and an inner circumferential side surface of the upper body 1251, the upper passage (not shown), and a hollow passage (not shown) of a discharge portion.

In the second embodiment of the present invention, the lower body 1232 may be formed by applying a PTFE membrane or Gore-Tex to a rigid member. In this case, it is possible to rapidly transmit high-pressure gas generated in the battery case to the interior of the venting device and to rapidly discharge the high-pressure gas to the outside.

FIG. 10 is a vertical sectional view showing the construction of a lower vent portion having a horizontal partition, a shaft unit, and an elastic portion according to a third embodiment of the present invention.

A venting device according to a third embodiment of the present invention is identical to the venting device according to the second embodiment of the present invention except for the horizontal partition 2234, and therefore only the horizontal partition 2234 will be described hereinafter.

The horizontal partition 2234 may be a ring-shaped plate formed along an inner side wall of the lower body 2232 so as to protrude therefrom. When the pressure in the battery case is increased, the elastic portion 2220 contracts, and, as a result, the shaft unit 2210 is moved upwardly toward the upper vent portion. That allows high-pressure gas in the battery case to be discharged to the outside. The elastic portion 2220 may be contracted until the lower flange is brought into tight contact with the horizontal partition 2234.

Here, the horizontal partition 2234 may be constituted by two or more partitions spaced apart from each other by a predetermined distance.

The venting device for pouch-shaped secondary batteries according to the present invention described above may be included in a pouch-shaped secondary battery, and pouch-shaped secondary batteries may be assembled to constitute a battery module.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE SYMBOLS 10, 100: Pouch-shaped secondary batteries
11, 110: Electrode terminals
12, 120: Battery cases
13, 130: Sealed portions
14: Degassing portion
200: Venting device
210, 1210, 2210: Shaft units
211, 1211, 2211: Lower disks
212: Lower flange
213: Shaft body
214: Main passage
215: Guide passage 216: Upper disk
220, 1220, 2220: Elastic portions
230, 1230, 2230: Lower vent portions
232, 1232, 2232: Lower bodies
240, 1240: Inner fixing portions
241: Upper end surface of inner fixing portion
242: Lower end surface of inner fixing portion
250: Upper vent portion
251, 1251, 2251: Upper bodies
252: Upper passage
260: Discharge portion
270: Wing portion
1231, 2231: Lower plates
1233: Vertical partition
2234: Horizontal partition
C: Cutting portion
G: High-pressure gas

The invention claimed is:

1. A venting device for a secondary battery, comprising:
a lower vent portion positionable within a receiving portion of a battery case, the lower vent portion defining a cavity therein;
an inner fixing portion having an opening defined therethrough is located in the cavity of the lower vent portion;
an upper vent portion extending upwardly from the cavity of the lower vent portion, the upper vent portion being positionable outside of the battery case;
a wing portion encircling an outer perimeter of the upper vent portion, the wing portion being positionable along a sealed portion of the battery case;
a discharge portion communicating with the upper vent portion to allow gas to pass from the upper vent portion through the discharge portion; and
a shaft unit located in the cavity of the lower vent portion, wherein the shaft unit comprises:
an elastic portion,
a shaft body having a main passage defined therein; and
a guide passage extending horizontally and communicating with the main passage,
wherein the main passage of the shaft unit is sealed off from the upper vent portion when the shaft unit is in a first position, such that gas is restricted from flowing between the main passage and the upper vent portion,
wherein the main passage of the shaft unit is in communication with the upper vent portion via the guide passage when the shaft unit is in a second position, such that gas can flow from the main passage to the upper vent portion, and
wherein the shaft unit is selectively movable between the first and the second positions and is biased toward the first position.

2. The venting device according to claim 1, wherein the shaft unit further comprises:
a lower disk located at a lower end thereof; and
an upper disk located at an upper end of the guide passage, wherein the shaft body has a flange and extends upwardly therefrom, and
wherein the elastic portion extends around an outer perimeter of the shaft body.

3. The venting device according to claim 2, wherein the lower disk is configured to allow a gas component generated in the battery case to pass therethrough without allowing an electrolytic solution to pass therethrough.

4. The venting device according to claim 2, wherein the elastic portion is located between the flange and the inner fixing portion.

5. The venting device according to claim 4, wherein the elastic portion is configured to bias the shaft unit such that:
when a pressure in the battery case is normal, the guide passage of the shaft unit is in the first position and the shaft unit is sealed by a surface of the inner fixing portion, and
when the pressure in the battery case is higher than a reference pressure, the shaft unit moves upwards to the second position such that the guide passage communicates with an upper passage of the upper vent portion to form an exhaust gas flow channel through the venting device.

6. The venting device according to claim 2, wherein the lower disk is located outside the cavity of the lower vent portion.

7. The venting device according to claim 2, wherein the lower disk is located in the cavity of the lower vent portion.

8. The venting device according to claim 7, wherein
a lower plate is located at a lower end of the lower vent portion, and
the lower plate is configured to allow a gas component generated in the battery case to pass therethrough without allowing an electrolytic solution to pass therethrough.

9. The venting device according to claim 7, wherein a partition is located in the cavity of the lower vent portion, and
wherein the elastic portion is configured to bias the shaft unit such that, when a pressure in the battery case is higher than a reference pressure, the shaft unit is permitted to move upwards to the second position until the flange comes into contact with the partition.

10. The venting device according to claim 2, wherein the lower disk is disposed outside of the main passage.

11. The venting device according to claim 1, wherein the discharge portion extends perpendicular to the upper vent portion.

12. The venting device according to claim 1, wherein, when the shaft unit is in the first position, the main passage of the shaft unit is sealed by a seal defined by engagement between the inner fixing portion and the shaft unit.

13. The venting device according to claim 1, wherein
the shaft body has a flange and extends upwardly therefrom, and
the elastic portion is located between the flange and the inner fixing portion.

14. A pouch-shaped secondary battery comprising the venting device according to claim 1.

15. The pouch-shaped secondary battery according to claim 14, wherein
the venting device is positioned through the sealed portion of the battery case, and
the venting device is positioned adjacent to an electrode lead extending outwardly from the battery case.

16. A battery module comprising the pouch-shaped secondary battery according to claim 15.

* * * * *